(12) United States Patent
Flyntz

(10) Patent No.: US 6,643,783 B2
(45) Date of Patent: *Nov. 4, 2003

(54) MULTI-LEVEL SECURE COMPUTER WITH TOKEN-BASED ACCESS CONTROL

(76) Inventor: Terence T. Flyntz, 7315 Billingsley Rd., Bryans Road, MD (US) 20616

( * ) Notice: Subject to any disclaimer, the term of this patent is extended or adjusted under 35 U.S.C. 154(b) by 0 days.

This patent is subject to a terminal disclaimer.

(21) Appl. No.: 10/094,590

(22) Filed: Mar. 8, 2002

(65) Prior Publication Data
US 2002/0147924 A1 Oct. 10, 2002

Related U.S. Application Data

(63) Continuation-in-part of application No. 09/563,452, filed on May 3, 2000, now Pat. No. 6,389,542, which is a continuation-in-part of application No. 09/427,445, filed on Oct. 27, 1999, now Pat. No. 6,351,817.

(51) Int. Cl.[7] .............................. G06F 11/30; H04K 1/00
(52) U.S. Cl. .................. 713/201; 713/202; 300/241; 300/202
(58) Field of Search ................................. 713/201, 200, 713/202; 380/240–241, 202, 239

(56) References Cited

U.S. PATENT DOCUMENTS

| | | | |
|---|---|---|---|
| 4,104,721 A | 8/1978 | Markstein | |
| 4,403,288 A * | 9/1983 | Christian et al. | 364/200 |
| 5,204,663 A | 4/1993 | Lee | |
| 5,263,165 A | 11/1993 | Janis | |
| 5,684,948 A | 11/1997 | Johnson | |
| 5,822,435 A | 10/1998 | Boebert | |
| 5,828,832 A | 10/1998 | Holden | |
| 5,894,551 A | 4/1999 | Huggins | |
| 5,968,176 A * | 10/1999 | Nessett et al. | 713/201 |
| 6,009,518 A | 12/1999 | Shiakallis | |
| 6,351,817 B1 * | 2/2002 | Flyntz | 713/202 |
| 6,389,542 B1 * | 5/2002 | Flyntz | 713/201 |
| 6,578,089 B1 * | 6/2003 | Simpson et al. | 709/249 |
| 2002/0002677 A1 * | 1/2002 | Eade et al. | 713/164 |

* cited by examiner

Primary Examiner—Norman Michael Wright
(74) Attorney, Agent, or Firm—David Newman Chrtd.

(57) ABSTRACT

A multilevel computer security system including a computer with multiple security subsystems for secure data storage and data communications at each security level, a smart-card reader for controlling user access to each security level, and an electronically-activated switch for activating only the selected and authorized security level. Access to each level of restricted data requires a user to insert his smart card into a smart-card reader. The selection of an authorized level generates an activation signal, for a selected security level and permitted computer assets for the selected security level. Since only one security level is ever active and the switching from one level to another requires the computer RAM to be powered off, there can be no possibility of user access to unauthorized data.

10 Claims, 4 Drawing Sheets

MULTI-LEVEL SECURE COMPUTER WITH TOKEN-BASED ACCESS CONTROL

RELATED PATENTS

This patent stems from a continuation-in-part application of patent application entitled, MULTI-LEVEL SECURE COMPUTER WITH TOKEN-BASED ACCESS CONTROL, having Ser. No. 09/563,452, filed May 3, 2000, issue as U.S. Pat. No. 6,389,542 on May 14, 2002, which stems from a continuation-in-part application of U.S. patent application Ser. No. 09/427,445, filed Oct. 27, 1999, entitled MULTI-LEVEL SECURE COMPUTER WITH TOKEN BASED ACCESS CONTROL, now U.S. Pat. No. 6,351,817, the priority of which parent applications for common subject matter is claimed in the captioned application pursuant to 35 U.S.C. §120.

BACKGROUND OF THE INVENTION

This invention relates to computer security, and more particularly, to a multilevel computer security system and a method for controlling user access which allows a computer to be used in a multilevel security environment, but prevents access of data at a particular security level by a computer user authorized to access the computer at a lower level.

DESCRIPTION OF THE RELEVANT ART

Prior-art, multilevel-computer systems include the separation of the elements that store or process data at each security level through user controlled means such as a mechanical switch or by physical removal of secure storage components such as the hard drives. The security of such computer systems is dependent on the user and not the user's assigned access privileges. It also leaves the data created, stored, or accessed by one user accessible to another unauthorized user. In addition, a switching mechanism that does not disable the operation of the storage and processing components that are not at the security level selected, creates the potential for data transfer between security levels through a covert transmission channel. Such channels only can be disabled through the removal of power from components at security levels that are not in use thereby disabling the channel at the source.

SUMMARY OF THE INVENTION

A general object of the invention is a computer security system and a method for controlling computer access which allows use of a common computer and operating system for different security levels, but makes it impossible for an authorized user at one security level to access data at a security level for which he is not authorized. In addition, access to specific processing assets and capabilities also may be controlled at and within each security level so that a user's rights to these assets and capabilities can also be controlled through the same access control method.

According to the present invention, as embodied and broadly described herein, a multilevel computer security system is provided, comprising a core computer, a first security subsystem, a second security subsystem, a smart-card reader, a first electronically-activated switch for controlling the connection of power from the computer-power supply to either of the two security subsystems, a first sensor switch for identifying and selecting the security level of the security subsystem to which power is to be connected, and additional electronically-activated switches for controlling power to specific assets within each security subsystem and the computer. The core computer has, at a minimum, a central processor unit (CPU), random access memory (RAM), and a power supply. Any additional read-only memory devices such as a compact disk (CD) drive are included within the computer as are any data interfaces to a display system and keyboard.

The central processor unit is coupled to and controls the operation of the devices and data interfaces within the core computer and the security subsystems that are used for data processing, data communications, and data storage. Each security subsystem is defined by at least a memory device, an activation indicator, and electronic communications devices that can include a modem, an encryptor, and a network interface card (NIC) that are connected in parallel with respect to the power terminals for each device and the indicator.

The first security subsystem has a first memory device for storing data at a first security level, which, by definition, is a level with unrestricted access. The first security subsystem may further have a first modem which, when activated, is operating with the computer as the only means of telecommunications at a first security level. The first security subsystem may further have a first network-interface card, which, when activated, is operating with the computer as the only interface to an external network at the first security level. Any other computer memory devices such as a floppy disk drive that are used to read or write data at the first security level must also be included within the first security subsystem. When all of the first security subsystem devices are activated the power connection illuminates the first activation indicator.

The second security subsystem has a removable-memory device which is the only means for storing data at a second security level. The second security subsystem may further have a second modem and encryptor which, when activated, is operating with the computer as the only means for encrypting telecommunications at a second security level. The second security subsystem may further have a second network-interface card, which, when activated, is operating with the computer as the only interface to an external network at the second security level. When the selected second security subsystem devices are activated, the power connection illuminates the second activation indicator.

The smart-card reader and its software determine if a compatible smart card is in the card reader at computer start-up. If no smart card were present, then the computer operating system loads from the first security subsystem memory device which operates at the first security level. If a compatible smart card were in the card reader, then the smart-card reader prevents the loading of the computer operating system and begins processing the stored program in the smart card.

The smart card has identification information stored within its memory. The smart-card information includes information on the smart card owner and the smart-card owner's allowed security access privileges. The smart-card reader interacts with the smart card and the identification information, and the computer user through the stored program in the smart-card memory. The smart-card program grants or denies access to a restricted security subsystem such as the second security subsystem in accordance with the acceptance of the identification information entered into the reader by the computer user. In response to granting access to the second security subsystem, the smart-card reader generates a first activation signal.

The first electronically-activated switch has a first contact connected to the first security subsystem, a second contact connected to the second security subsystem, and a common contact that is connected to the computer-power supply. The switch is activated by the first activation signal applied to an activation contact. If there were no activation signal, then the first electronically-activated switch is in a normally closed position in which the common contact is connected to the first contact. When the first activation signal is received at the activation contact, then the first electronically-activated switch connects the common contact with the second contact position.

The first sensor switch is a mechanically-activated cam switch. This switch is closed by the correct insertion of the removable memory for the second security subsystem into the computer memory receptacle. The removable memory for the second security subsystem has a mechanical cam that is physically located and configured to contact and close the first sensor switch.

The first electronically-activated switch normally is set at the first contact position which is the normally closed position. In the first contact position, the computer operates only with the first security subsystem since it is connected to the computer-power supply through the common contact. The first security subsystem stores unrestricted data at a first security level and is accessible by default without using the smart card when the computer is started. The first security subsystem also can be accessed via the smart card by selecting the first security subsystem via the smart-card program. If a user selected the first security subsystem, then the smart-card program terminates and no activation signal is transmitted to the first electronically activated switch. This maintains the power connection to the first security subsystem and the operating system on the first memory device begins loading after termination of the smart card program.

When an owner of a smart card is granted access to the second security subsystem, then the first activation signal is outputted from the smart card. The first activation signal is connected to the activation contact of the first electronically-activated switch if the removable memory for the second security subsystem is correctly inserted in the memory receptacle. In response to the first activation signal, the first electronically activated switch disconnects the common contact from the first contact and connects the common contact with the second contact. In this second contact position, the computer operates only with the second security subsystem which is the only security subsystem connected to the computer-power supply.

The present invention also includes a multilevel computer security method, for use with a computer. The method comprises the steps for implementing high assurance data access control and secure data processing, data storage, and data communications for data at a first security level and data at a second security level within a common computer. The first step is to maintain physical separation of the data at a first security level from the data at a second security level by performing all data storage, data communications, and network communications at each level with devices dedicated to that level. The second step connects all of the dedicated devices for the first security level to a first power circuit so that they comprise a first security subsystem and all of the dedicated devices for the second security level to a second power circuit so that they comprise a second security subsystem. The third step utilizes an electronically-activated switch to switch the power from the computer-power supply from the first security subsystem to the second security subsystem in response to the first activation signal. The fourth step utilizes a smart card reader to read a smart card if a smart card were in the smart-card reader when the computer is started. The fifth step includes the smart card reader interrupting the loading of the operating system from the first memory device in the first security subsystem if the smart-card were valid. The sixth step has the smart card reader comparing a users identification data with the data stored on the smart-card to validate the identity of the user and to then initiate the security level access control process from the program stored in the smart-card. The seventh step is for the smart card program to compare the users access request for access to data at the second security level with the stored access privileges on the smart-card and either grant or deny access. The eighth step has the smart-card reader generate the first activation signal for the second security subsystem if access were granted or terminate the smart-card reader software and allow the operating system from the first memory device to load for default access to the unrestricted data in the first security subsystem. The ninth step transmits the first activation signal for the second security subsystem to the electronically activated switch via a closed sensor switch and activate the second security subsystem. The tenth step is for the sensor switch to disable the transmission of the first activation signal if the second security subsystem were not available, which prevents the activation of the second security subsystem until it is properly installed and disable the default activation of the first security subsystem until the smart-card is removed.

A simple refinement to the access control apparatus and method described above allows access privileges stored on a users smart card to limit access to specific assets within the second security subsystem. A user, for example, could have privileges that allow access to the hard drive within the second security subsystem but not to the modem, encryptor, or network interface card. Since access to the hard drive in the second security subsystem is necessary for the operation of the subsystem other combinations with the hard drive would also be possible. These could include the hard drive, encryptor, and modem or hard drive, encryptor, and network interface card.

The refinement could be implemented by having the smart-card reader read the access privileges on the smart-card and output an activation signal, such as the first activation signal, having multiple bits in a serial word. The output word would then be stored in a register wherein each bit in the stored word corresponds to an activation signal for an electronically-activated switch. In such an apparatus and method the first bit could correspond to the first activation signal. As before the first activation signal is connected to the activation contact of the first electronically-activated switch if the removable memory for the second security subsystem is correctly inserted in the memory receptacle.

The additional bits are used as activation signals for additional electronically-activated switches that control power to the other assets within the second subsystem. One bit would be used to control power to the modem, a second to control power to the network interface card, and a third to control power to the encryptor. Additional bits also could be used to control power to assets outside the subsystem such as parallel and serial output ports. This modification to the described access control apparatus and method would significantly increase the capability to refine and modify access control privileges through simple reprogramming of a users smart-card.

The conversion of the personal computer to a computer with multi-level security is simplified through the utilization of power interface devices that can control the application of power to the computer components that interface with the computers CPU such as modems, NICs, and the removable-memory devices. In the case of components such as NICs and modems this interface is via the computer motherboard and its ISA or PCI bus which also directly provide power to the components that are inserted in the ISA or PCI bus slots. The control of this power can be implemented by physically modifying the motherboard so that a switch is inserted between the power line from the motherboard to the ISA or PCI slot. This is very difficult and time consuming and is not always possible on complex multi-layer boards. A better solution is to utilize a circuit board that can be inserted into the slot to pass all the electronic signals to the component and has a switch already inserted in the power line. This PCI/ISA Power Control Interface Circuit Card would have a connector at one end designed for the motherboard PCI or ISA slot and a PCI or ISA slot at the other end that would accept the component that was being controlled. A control line interface would also be provided to enable or disable power to the inserted component.

A removable memory device could be controlled by placing a switch in the circuit that connects the device to the computer power supply. This switch could be implemented within the removable memory device's internal power line so that the computer power cables would not have to be modified. The memory device would then be activated when a signal was received that indicated that the memory device for that security subsystem was to be powered on. A refinement to this approach would include a processing capability within the removable memory device that would only activate the memory device if a specific set of bits was received in addition to the activation signal for the memory device. These received bits would correspond to the identity of the user and their smart card and the security level of the drive. This would allow access to the removable drive to be linked to the identity of the user and their smart card as well as to the security subsystem.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims. These include physical implementations of the multilevel computer security method that can be easily applied to existing personal computers. This would allow an existing personal computer to be easily converted to a computer with multi-level security.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
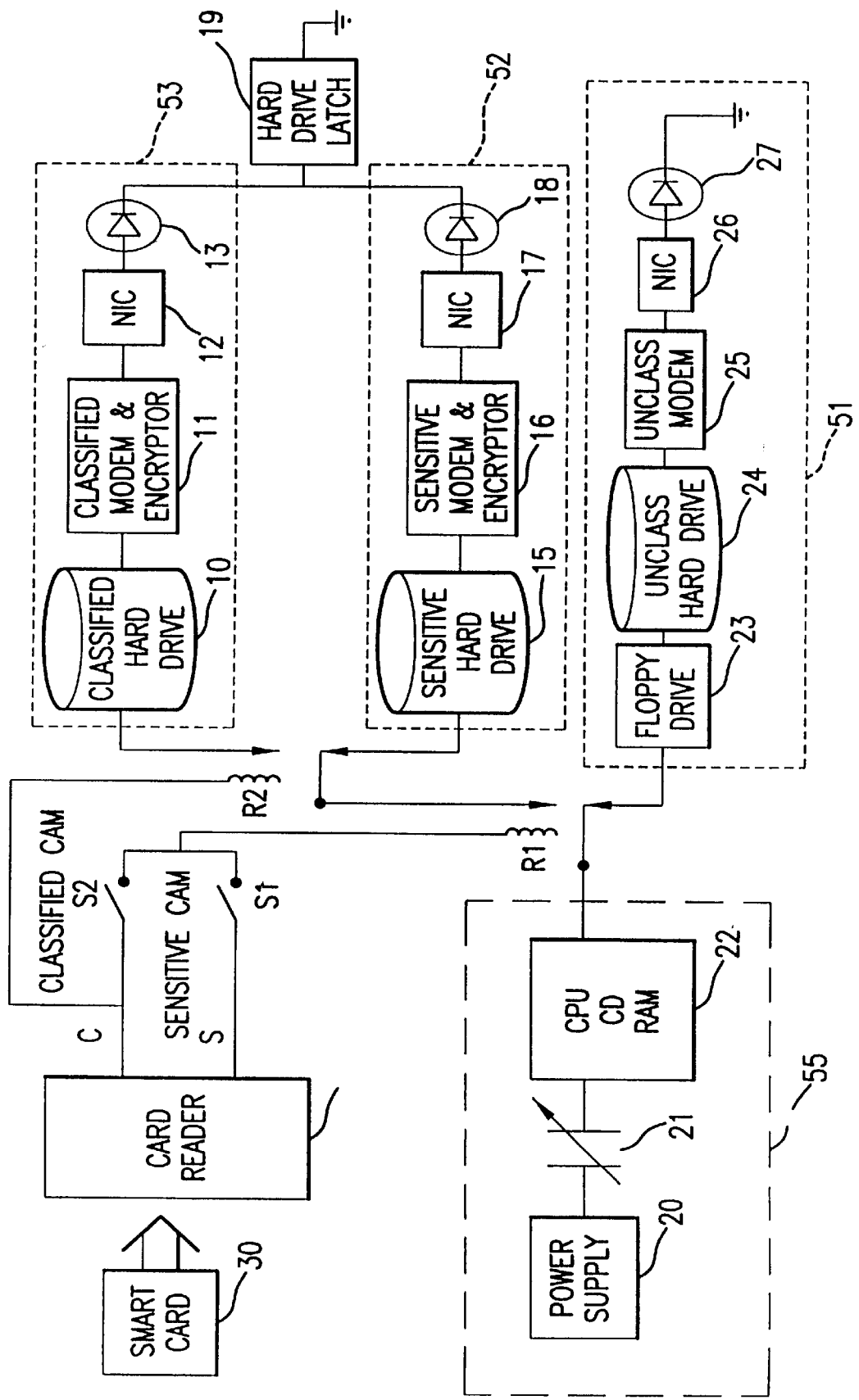
FIG. 1 is a block diagram of the multilevel computer security system with two removable drives and one fixed drive serves to explain the principles of the invention.

Reference now is made in detail to the present preferred embodiments of the invention, examples of which are illustrated in the accompanying drawings, wherein like reference numerals indicate like elements throughout the several views.

The present invention provides a controlled removal of power from computer components, such as those that are directly connected to power via the computer motherboard or cables connected to the computer power supply, through the utilization of power control interface devices. The power control interface devices are capable of being controlled based on the selected security level. Discussion is first directed to a multilevel security system, with reference to FIGS. 1 and 2. Then discussion is directed to the power control interface devices, with reference to FIGS. 3 and 4, which are used with the multilevel security system.

As illustratively shown in FIG. 1, a multilevel computer security system is provided, comprising a core computer 55, a first security subsystem 51, a second security subsystem 52, a smart card reader 31, a first electronically-activated switch R1, and a first mechanically-activated-sensor switch S1. The core computer 55 typically has, as a minimum, a central processor unit (CPU), random access memory (RAM), and a power supply 20. Additional read-only memory devices, such as a compact disk (CD) drive, are included within the computer as are any data interfaces to an external display and keyboard. The CPU is coupled to and controls the operation of the devices and data interfaces within the core computer and the security subsystems that are used for data processing, data communications, and data storage.

The core computer 55 also includes a power supply 20 and a tamper switch 21. The tamper switch 21 disconnects the power to the computer from power supply 20 if access to the computer were attempted through the dismantling of the computer case. The computer employs a disk operating system (DOS), Windows, UNIX, or other system, which are well-known in the art. Each security subsystem has its own disk operating system stored on its memory device. All of the devices in a security subsystem are linked through a parallel power connection to the computer-power supply 20 via an electronically-activated switch, which might be embodied as a relay.

The first security subsystem 51 has a first memory device 24 for storing data at a first security level, which by definition is an unrestricted security level. The first security subsystem 51 may further have a first modem 25 for providing telecommunications for data at a first security level. A first network interface card 26 also may be included in the first security subsystem as a means to interface with an external data network with data at the first security level. Other memory elements used to read and write data at a first security level may be included in the first security subsystem 51, as required, such as a floppy disk drive 23. A first activation indicator 27 that may be embodied as a first light emitting diode (LED) may be included in the first security subsystem. The first LED indicates when power is switched to the devices within the first security subsystem through a connection to the computer-power supply via first electronically-activated switch R1. The data and control coupling between the computer 55 and first memory device 24, first modem 25 and first network interface card 26 may be through a computer bus, such as PCI bus, SCSI bus, or other computer bus, as is well-known in the art.

The second security subsystem 52 has a second memory device 15 that is removable from the computer and is used for storing data at a second security level. The second security subsystem 52 may further have a second modem 16 for providing telecommunications for data at a second security level. An encryptor may be included in the second modem 16 for encrypting the data being transmitted by the second modem 16 at a second security level and decrypting the data being received by the second modem 16 at a second security level. The encryptor may also be used for encrypting data stored on the second memory device 15 at the end of a user session and decrypting the data stored on the second memory device 15 at the beginning of a user session.

A second network interface card 17 also may be included in the second security subsystem 52 as a means for interfacing with an external data network with data at a second security level. A second activation indicator 18, that may be embodied as a second LED, may be included in the second security subsystem 52. The second LED indicates when power is switched to the devices within the second security subsystem 52 through a connection to the computer-power supply 20 via first electronically-activated switch R1. The data and control coupling between the core computer 55, second memory device 15, second modem 16, and second network interface card 17 may be through a computer bus, such as a PCI bus, SCSI bus, or other computer bus, as is well-known in the art.

The smart-card reader 31 and its software determine if a compatible smart-card 30 were in the smart-card reader 31 whenever the computer is powered on. If no card were present, then the computer operating system loads from the first memory device 24 in the first security subsystem 51, and operates at the first security level. If a compatible smart-card 30 were in the smart-card reader 31, then the smart-card reader software prevents the loading of the computer operating system and initializes the stored program in the smart-card 30.

The smart-card 30 has identification information about the card owner stored within its internal memory. The identification information can include the card owner's assigned personal identification number (PIN) or some biometrics. Biometrics are essentially a stored representation of a physical characteristic of the card owner such as a digitized finger print, retinal scan, or facial geometry. In addition to the identification information, the smart card 30 stores the card owner's security access privileges with respect to the allowed access to data at various security levels.

The smart-card reader 31 interacts with the smart card 30 and the stored identification information through the actions of the computer program stored within the smart card 30. The computer program first compares a users identification information as entered into the card reader 31 with the identification information stored in the smart card 30 for the card owner. If the information were identical, then the program allows the user to select one of the security levels authorized for use by the card owner. When the user selects an allowed security level, then the card reader 31 outputs a unique activation signal associated with the level selected. In response to permitting access to the second security subsystem the smart-card reader 31 generates a first activation signal.

The first electronically-activated switch R1 has a first contact connected to the first security subsystem 51, a second contact connected to the second security subsystem 52, and a first common contact that is connected to the computer-power supply. The first electronically-activated switch R1 also has a first activation contact which is connected to the smart-card reader 31 via a first mechanically-activated-sensor switch S1. A mechanically-activated-sensor switch typically is a cam. If no activation signal were present at the first activation contact of the first electronically-activated switch R1, then the first electronically-activated switch is in a normally closed position and the first common contact is connected to the first contact. This causes the computer-power supply 20 to be connected to the first security subsystem 51 which is the default subsystem used for processing unrestricted data. All of the devices in the first security subsystem 51 are activated and the first activation indicator 27 is illuminated.

When an activation signal is applied to the activation contact of the first electronically-activated switch R1, then the first common contact is connected to the second contact. This causes the power supply 20 to be disconnected from the first security subsystem 51 and connected to the second security subsystem 52. All of the devices in the second security system 52 are activated and the second activation indicator 18 are illuminated. Conversely all of the devices in the first security subsystem 51 are deactivated and the first activation indicator 27 will no longer be illuminated.

The mechanically-activated sensor switches, or cams, are a key element of the multilevel computer since they determine if the activation signal generated by the card reader should be transmitted to the electronically-activated switches. If the card reader 31 generated a first activation signal for the activation of the second security subsystem 52, then the signal is transmitted to the first electronically-activated switch R1 if the first sensor switch S1 were closed. Since the first sensor switch S1 closes if the second memory device 15 were in the memory receptacle, the second security subsystem 52 is activated if the second memory device 15 required for the storage of data at the second security level were installed properly in the memory receptacle. The installation of any other memory device does not close the first sensor switch S1 thereby preventing the activation of the second security subsystem 52 and maintaining the activation of the first security subsystem 51. It is the operation of the mechanically-activated sensor switches that ensures that the correct memory device is installed and activated so that the stored data at a given security level cannot be accessed or processed by devices and users at a different security level.

The multilevel computer security system may further comprise a third security subsystem 53, a second electronically-activated switch R2, and a second mechanically-activated sensor switch S2. The third security subsystem 53 has a third memory device 10 that is removable from the computer and is used for storing data at a third security level. The third security subsystem 53 may further have a third modem 11 for providing telecommunications for data at a third security level. An encryptor may be included in the third modem 11 for encrypting the data being transmitted by the third modem 11 at a third security level and decrypting the data being received by the third modem 11 at a third security level. The encryptor may also be used for encrypting data stored on the third memory device 10 at the end of a user session and decrypting the data stored on the third memory device 10 at the beginning of a user session. A third network interface card 12 also may be included in the third security subsystem as a means to interface with an external data network with data at a third security level. A third activation indicator 13 that may be embodied as a third LED may be included in the third security subsystem 53. The third LED indicates when power is switched to the devices within the third security subsystem 53 through a connection to the computer-power supply 20 via R2. The data and control coupling between the computer 55 and third memory device 10, third modem 11, and third network interface card 12 may be through a computer bus, such as a PCI bus, SCSI bus, or other computer bus, as is well-known in the art.

With the third security subsystem 53, when the smart-card reader 31 reads the smart card 30 with the identification information, the smart-card reader 31 interacts with the smart card 30 and the stored identification information via the internal program, as before. If the smart-card internal program granted access to the third security subsystem 53, then the smart-card reader 31 generates a second activation signal.

The second electronically-activated switch R2 has a third contact connected to the second security subsystem 52, a fourth contact connected to the third security subsystem 52, and a second common contact that is connected to the second contact of the first electronically activated switch R1. The second electronically-activated switch R2 also has a second activation contact which is directly connected to the smart-card reader 31. If there were no activation signal at the second activation contact of the second electronically-activated switch R2, then the switch is in a normally closed position and the second common contact is connected to the third contact of the second electronically activated switch R2. This causes the computer-power supply 20 to be connected to the first security subsystem 51. All of the devices in the first security subsystem 51 are activated and the first activation indicator 27 is illuminated.

When the second activation signal is applied to the second activation contact of the second electronically-activated switch R2, the second common contact is connected to the fourth contact of the second electronically-activated switch R2. This causes the third security subsystem 53 to be connected to the second contact of the first electronically-activated switch R1. If the second activation signal were successfully transmitted to R1 via the closed sensor switch S2, then the first common contact of the first electronically-activated switch R1 is connected to second contact of the first electronically-activated switch R1. This causes the power supply 20 to connect to the third security subsystem 53 and disconnect from the first security subsystem. The devices in the third security system 53 then are activated and the third activation indicator 13 is illuminated. Conversely, the devices in the first security subsystem 51 are deactivated and the first activation indicator 27 no longer is illuminated.

The mechanically-activated-sensor switches, cams, are key elements of the multilevel computer since they determine if the second activation signal generated by the card reader 31 should be transmitted to the first electronically-activated switch R1. If the card reader 31 generated a second activation signal for then the second activation of the third security subsystem 53, the signal is transmitted to R1 if the second sensor switch S2 were closed. Since the second sensor switch S2 close if the third memory device 10 were in the memory receptacle, the third security subsystem 53 is activated if the third memory device 10 required for the storage of data at the third security level were installed. The closing of the second sensor switch S2 enables the second activation signal to switch both the first electronically-activated switch R1 and the second electronically-activated switch R2 to the second and fourth contact points, respectively. This enables the power supply 20 to be connected only to the third security subsystem 53. The installation of any other memory device does not close the second sensor switch S2 thereby preventing both the deactivation of the first security subsystem 51 and the activation of the third security subsystem 53. The operation of the second sensor switch S2 ensures that the correct memory device is installed and activated so that the stored data at the third security level cannot be accessed or processed by devices and users at a different security level.

It is evident from the above discussion that the multilevel computer security system may be extended to include a number of additional security subsystems for higher level data that can be selected and activated through the operation of the smart-card, smart card reader, and additional electronically-activated switches and mechanically-activated-sensor switches. Each additional security subsystem would include a removable-memory device, a modem with encryptor, a network interface card, and an activation indicator.

All of the devices in the additional security subsystems are under the control of the CPU 22 and are linked through a parallel power connection to the computer-power supply 20 via a combination of electronically-activated switches. The addition of one additional electronically-activated switch is required for each additional security subsystem. The electronically-activated switches are connected so that the normally open contact for the electronically-activated switch at security level n is connected to the normally closed contact for the electronically-activated switch at the next higher security level n+1 as is seen in FIG. 1 for the connection of R1 and R2. The normally closed contact for the electronically-activated switch at level n is also connected to the power circuit connecting the security subsystem devices at level n.

A security subsystem at level n has a unique activation signal that is generated by the card reader 31 in response to valid authorization for a user to access the data at security level n in that subsystem. The activation signal for the security subsystem at level n is directly connected to the activation contact of each one of the electronically-activated switches at levels above the first security level and below level n. In addition, the activation signal for the security subsystem at level n also is connected to the first electronically-activated switch R1 via the sensor switch that can only be closed by the correct insertion of memory device n in the memory receptacle. This ensures that the security subsystem will only be activated if the correct memory device for that subsystem is installed. The installation of any other memory will not activate the first electronically-activated switch R1 which will maintain the activation of the first security subsystem 51.

The present invention also includes a multilevel computer security method, for use with a computer. This method is based on creating electrically isolated security subsystems within a common computer such that: each subsystem includes devices for the secure storage, telecommunications, and networking of data at a given security level; each subsystem can be coupled with the computer CPU, RAM, and Read-Only Memory devices to comprise a complete computer system that can only access, store, and process data at one security level during any given time; only one subsystem can be activated at a given time with all others being electrically inactive; the subsystem at the lowest security level is automatically activated at computer startup unless a higher level subsystem is selected and authorized; the activation of each subsystem above the subsystem at the lowest security level requires a computer user to be identified and authorized access based on the user's security privileges; the security privileges of each user are defined for each restricted security subsystem in a password controlled smart-card token that is used for access control to each restricted subsystem; each subsystem has unique physical characteristics that are utilized along with the user identification and authorization to ensure that the correct subsystem has been activated; the selection of a different security level must be done after logging out of the current level and allowing the operating system to turn the computer off so that the computer RAM is cleared.

The method provides high assurance data access control and secure data processing, data storage, and data communications for data at a first security level and data at a second security level within a common computer 55 consisting of: a CPU; RAM; power supply 20; smart card 30; smart card reader 31; a first security subsystem 51 comprised of a first memory device 24, first modem 25, first NIC 26, and first activation indicator 27 connected to a first power circuit; a second security subsystem 52 comprised of second memory device 15, second modem and encryptor 16, second NIC 17 and second activation indicator connected to a second power circuit; a first electronically-activated switch R1; and a first mechanically-activated sensor switch S1.

Within the core computer 55, the method comprises the steps of: utilizing the first security subsystem 51 to process and store the data at the first security level after loading the operating system from the first memory device 24 if there were no smart-card 30 in the smart-card reader 31; activating the smart-card reader software which deactivates the loading of the operating system from the first memory device 24 if a valid smart-card 30 were detected in the smart-card reader 31; having the smart-card reader 31 compare a users identification data with the data stored on the smart-card 30 to validate the identity of the user and to then initiate the security level access control process from the program stored in the smart-card 30; utilizing the smart-card program to compare the users access request for access to data at the second security level with the stored access privileges on the smart-card 30 and either grant or deny access; having the smart-card reader 31 generate an activation signal for the second security subsystem 52 if access is granted or terminate the smart-card reader software and allow the operating system from the first memory device 24 to load for default access to the unrestricted data in the first security subsystem 51; transmitting the activation signal for the second security subsystem 52 to the first electronically activated switch R1 via a closed first sensor switch S1 which activates the second security subsystem 52 by connecting the second power circuit to the power supply 20 and simultaneously deactivates the first security subsystem by disconnecting the first power circuit from the power supply 20; if the second memory device 15 were detected by the first sensor switch S1 as not being installed, the first sensor switch disables the transmission of the activation signal thus preventing the activation of the second security subsystem 51 and disables the default activation of the first security subsystem 51 until the smart-card 30 is removed from the smart-card reader 31.

In a more general sense, the method could be applied to a multilevel security process with n levels through the addition of steps for each level. A method for n levels would provide high assurance data access control and secure data processing, data storage, and data communications for data at a first security level and data at an $n^{th}$ security level within a common computer 55 consisting of: a CPU; RAM; power supply 20; smart card 30; smart card reader 31; a first security subsystem 51 comprised of a first memory device 24, first modem 25, first NIC 26, and first activation indicator 27 connected to a first power circuit; an $n^{th}$ security subsystem 52 comprised of $n^{th}$ memory device 15, $n^{th}$ modem and encryptor 16, $n^{th}$ NIC 17 and $n^{th}$ activation indicator connected to a second power circuit; n-1 electronically-activated switches; and n-1 mechanically-activated sensor switches.

At the $n^{th}$ security level the method would comprise the steps of: utilizing the first security subsystem 51 to process and store the data at the first security level after loading the operating system from the first memory device 24 if there were no smart-card 30 in the smart-card reader 31; activating the smart-card reader software which deactivates the loading of the operating system from the first memory device 24 if a valid smart-card 30 were detected in the smart-card reader 31; having the smart-card reader 31 compare a users identification data with the data stored on the smart-card 30 to validate the identity of the user and to then initiate the security level access control process from the program stored in the smart-card 30; utilizing the smart-card program to compare the users access request for access to data at the $n^{th}$ security level with the stored access privileges on the smart-card 30 and either grant or deny access; having the smart-card reader 31 generate an activation signal for the $n^{th}$ security subsystem 52 if access were granted or terminate the smart-card reader software and allow the operating system from the first memory device 24 to load for default access to the unrestricted data in the first security subsystem 51; transmitting the activation signal for the $n^{th}$ security subsystem directly to all the electronically-activated switches at levels above the first security level and below level n and to R1 via a closed $(n-1)^{th}$ sensor switch S(n-1) which activate the $n^{th}$ security subsystem by connecting the $n^{th}$ power circuit to the power supply 20 and simultaneously deactivates the first security subsystem by disconnecting the first power circuit from the power supply 20; if the $n^{th}$ memory device were detected by the $(n-1)^{th}$ sensor switch S(n-1), the $(n-1)^{th}$ sensor switch will disable the transmission of the activation signal thus preventing the activation of the $n^{th}$ security subsystem and disable the default activation of the first security subsystem until the smart-card 30 is removed from the smart card reader.

The present invention is based on a standard personal computer (PC) with multiple hard drives, modems, network interface cards (NICs), and LED indicators including one or more hard drives that are removable. Each hard drive, modem, NIC and LED are associated with a specific level of security access and are either powered on or off depending on the security level selected by an authorized user. Access to the drives, modems, and NICs is based on the assigned access rights of the user as defined on their smart card 30 and the level of security access selected by the user from within their assigned security access rights. The hard drive, modem, NIC, and LED at a given security level are directly connected such that power is either on or off to all depending on the level of security access selected. This also ensures that the LED provides a true indication as to what security level is active.

The authorization for a selected security level is granted or denied by the smart-card program which verifies the user PIN or biometric data. If this data were valid, then the program determines if the stored security rights allow access to the level selected. If access were granted an activation signal is generated by the card reader for the activation of the security subsystem at the selected security level. These activation signals are shown as S (secret) or C (confidential) in FIG. 1 to designate the level selected. There also is a mechanical interlock on the removable hard drives that automatically ensures that power is only applied to the drive, modem, and NIC at the security level selected by the operator. The interlock essentially is a cam switch, that is closed by a cam that is located and configured on the hard drive to contact and close the cam switch when the hard drive is inserted in the drive bay. The location and configuration of the cam on the drive is keyed to the security level of the hard drive and is aligned to close only the switch in the drive bay that is set for that level. As is seen from FIG. 1, only the combination of the proper cam switch and card reader output signal activates the correct hard drive, modem, NIC, and LED indicator.

The circuit shown in FIG. 1 also has several additional features that ensure that secure data received, sent, or stored within the computer is never at risk. Each of the security subsystems can send and receive data from a dial-up interface via an internal modem with the appropriate type of encryption for the level of security provided by the subsystem. If the security level corresponded to classified data, the encryption would be based on a Type I algorithm located on a classified modem. Such modems are controlled by the National Security Agency and are available from authorized manufacturers in a PCMCIA configuration for approved users only.

If the selected restriction level were below classified but above unclassified, then the modem would utilize a Type II encryption algorithm on the PCMCIA card that is available for public use within the United States. The encryption algorithms also are utilized to encrypt the data on the hard drives at the end of each user session. This protects the data on the hard drive regardless of whether the drive is removed for unauthorized use. In addition, the removable hard drives also are locked within the computer by a hard drive latch 19 that physically prevents the drive from being removed while activated. The locking ensures that there is no vulnerability due to the possible removal of a drive during an on-going session while the data still is unencrypted. The computer also has a tamper switch 21 with a breakable link that disconnects all power to the computer if the computer were opened in an unauthorized manner.

The basic principle of this computer system is the utilization of secure smart card identification and authentication of the user in combination with a mechanical interlock mechanism to control access to different security levels of a computer through the controlled application of power to the appropriate hard drives, modems, and NICs. At start-up the computer initially accesses the smart-card reader 31 before loading the operating system in the default first memory device. The user then logs on through the insertion of their smart card 30 and the entry of a personal identification number via the keyboard or biometric data from a biometrics device such as a fingerprint reader. If the user selected the unrestricted mode of operation or were only authorized to use this mode based on the information on the smart card 30, then the operating system loads and none of the relays are activated since there are no signals out of the smart-card reader 31. In the unrestricted mode the user has access to all computer facilities including the unrestricted hard drive, modem, NIC, and any other memory devices used to read and write unclassified data such as a floppy disk drive.

The selection of higher levels of security requires the entry and verification of the user identification and access rights coupled with the sensing of the correct removable hard for the security level selected through the action of the cam switches. These switches are essential in ensuring that the correct drive and the associated modem, and NIC are enabled.

In addition, the selection of a new security level can only be implemented after logging out of the operating system for the previous level and allowing the computer to power off. This is necessary to avoid any crossover of data from one security level to another via the computer RAM which is cleared when power is removed. The RAM is the singular read-write memory device that is shared by all security subsystems. The implementation of this requirement is also built-in to the operation of most operating systems since logging off the operating system at any level will naturally result in a power down. Even if this were not so, the utilization of the card-reader 31 to access a new security level also requires the computer to be powered off and then restarted. This feature of the card-reader software is required so that all secure transactions with the smart-card are under the control of the smart-card reader software which is designed to be more secure than a disk operating system.

The computer can have multiple hard drives and a single drive bay or a bay for each removable hard drive. Either configuration will work with the circuitry shown in FIG. 1. In a single bay system, the bay is configured for switches that are keyed to each level of hard drive. For example, in FIG. 1 the insertion of a hard drive with a sensitive (S) security level would activate the cam switch for that level but would not activate the cam for any other level.

If the operator selected and was granted access to the S level, first electronically-activated switch R1 would be activated and power would be applied to the S level hard drive, modem, NIC, and LED. Conversely there would be no power on either the unrestricted or C level hard drives, modems, NICs, and LEDs nor on the floppy drive. If the operator selected and was granted access to the C level, the C level drive would need to be inserted into the drive bay. This would close the C level cam switch and leave the S level switch open. The closing of the C level switch would allow the C activation signal to activate first and second electronically-activated switches R1 and R2 which would only apply power to the classified hard drive, modem, NIC and LED.

The mechanical interlock also ensures that a mistake cannot be made by inserting a drive that is at a level that differs from what was selected and approved for the user via their smart card. If such a mistake were made the correct cam switch could not be closed and an activation signal could not be received at the first electronically-activated switch R1. This would disable power to any other security subsystem other than the unclassified system. Any mistake of this type with a drive at any security level would result in a default to unclassified operation. This condition would be seen immediately since the screen that appears with the loading of the operating system on the unclassified drive will indicate the restriction level in bold text. The operator also sees the illumination of the unclassified LED indicator 27.

The operating system on each hard drive presents a screen identifying its restriction level. Protection against having more than one hard drive, modem, and LED indicator powered is also prevented by the normally closed configuration of the first and second electronically-activated switches R1, R2 in FIG. 1. It is evident that if either the S or C security level were selected, then first electronically-activated switch R1 is activated and there can be no power to the unrestricted hard drive, modem, NIC, LED, or floppy drive which disables any possible crossover of secure data to the unrestricted part of the computer. In addition the coupling of the activation signal output from the card reader with the hard drive cam switches and the electronically-activated switches makes it impossible for more than one security subsystem to be powered at any given time.

The system shown in FIG. 1 also would operate with a computer that had separate bays for each removable hard drive. In such a system each bay would have one cam switch that was keyed to a specific level hard drive. The positioning of the cams on the drive and in the bays would be the same as on the single removable drive computer. This would ensure that a hard drive would be recognized at the correct level in either computer. Each bay would be clearly labeled to identify its level so that the operator would insert the correct drive. If the wrong drive were inserted in either or both drives neither drive would be activated and the system would operate only in the unrestricted mode as was described earlier.

There are implementations of the multilevel computer security method that are independent of the computer as a whole. These implementations describe a modification to an existing computer that would allow it to be easily converted to a multilevel computer with all or some of the security features described herein. Most of these implementations are based on the packaging of specific elements of the multilevel computer security method so that they could be easily provided within a kit that could be installed by a computer user with average expertise.

One implementation of a modification kit would involve the packaging of a complete security subsystem into a removable drive enclosure with the cam switches being mounted in the drive bay. In this implementation all of the security subsystem devices including the hard drive, modem, NIC, and LED activation indicator would be powered through a connection within the drive enclosure as is seen for the second security subsystem in FIG. 1.

A second removable drive enclosure would house the computer's card reader and a printed circuit card with an electronically-activated switch and an LED activation indicator and connector interfaces for a modem, NIC, and the existing computer internal hard and floppy drives. The LED activation indicator and connector interfaces are wired with a parallel power connection. The electronically-activated switch is equivalent to the first electronically-activated switch R1 and has its normally closed contact connected to the power connection in the second removable drive enclosure as is seen in FIG. 1.

The connector interfaces for the modem and NIC in the second removable drive enclosure are in the configuration of PCMCIA slots that support the installation of a modem and NIC within the enclosure or allow for a connection to an existing computer modem and NIC through a cable with a PCMCIA interface. The connection to the computers internal hard drive and floppy drive is via standard ribbon cables and connectors.

The card reader activation signals would be connected to the appropriate cam switch inputs located on the first removable drive bay. Similarly the cam switch outputs would be connected to the activation contact of the electronically-activated switch in the second removable drive bay as seen in FIG. 1. The normally open contact of the electronically activated switch would be connected to the power circuit in the first drive bay. All of these connections between the first and second drive bays would be implemented via a cable connected between the two bays. Finally, the power supply connection to the common contact of the electronically activated switch would be implemented via an internal power cable that would connect to the second drive bay.

From the description above it is evident that any modern personal computer with two spare drive bay slots could easily be converted to a multilevel security computer through the installation of a simple kit consisting of two drive bays. The installation would also require the connection of some new cables to the drive bays and the disconnection of several existing computer cables to the internal hard drive and floppy disk drive and possibly the internal modem and NIC.

The invention described thus far could be further enhanced through the addition of some simple electronics components. As depicted in FIG. 1, the current invention is based on a smart-card with basic processing capability and a smart-card reader with some internal processing capability and a program that allows it to read the identification data on the smart-card and output a discrete activation signal based on this data. Smart-cards with internal processors are often referred to as microprocessor cards and have become quite sophisticated in their processing capabilities. While microprocessor cards are readily available most smart-cards are memory cards used for data storage. Memory cards can also be utilized in the current invention with the modifications described below. In addition, these modifications will also support the use of smart-card readers with no internal processing capability.

Figure 2:
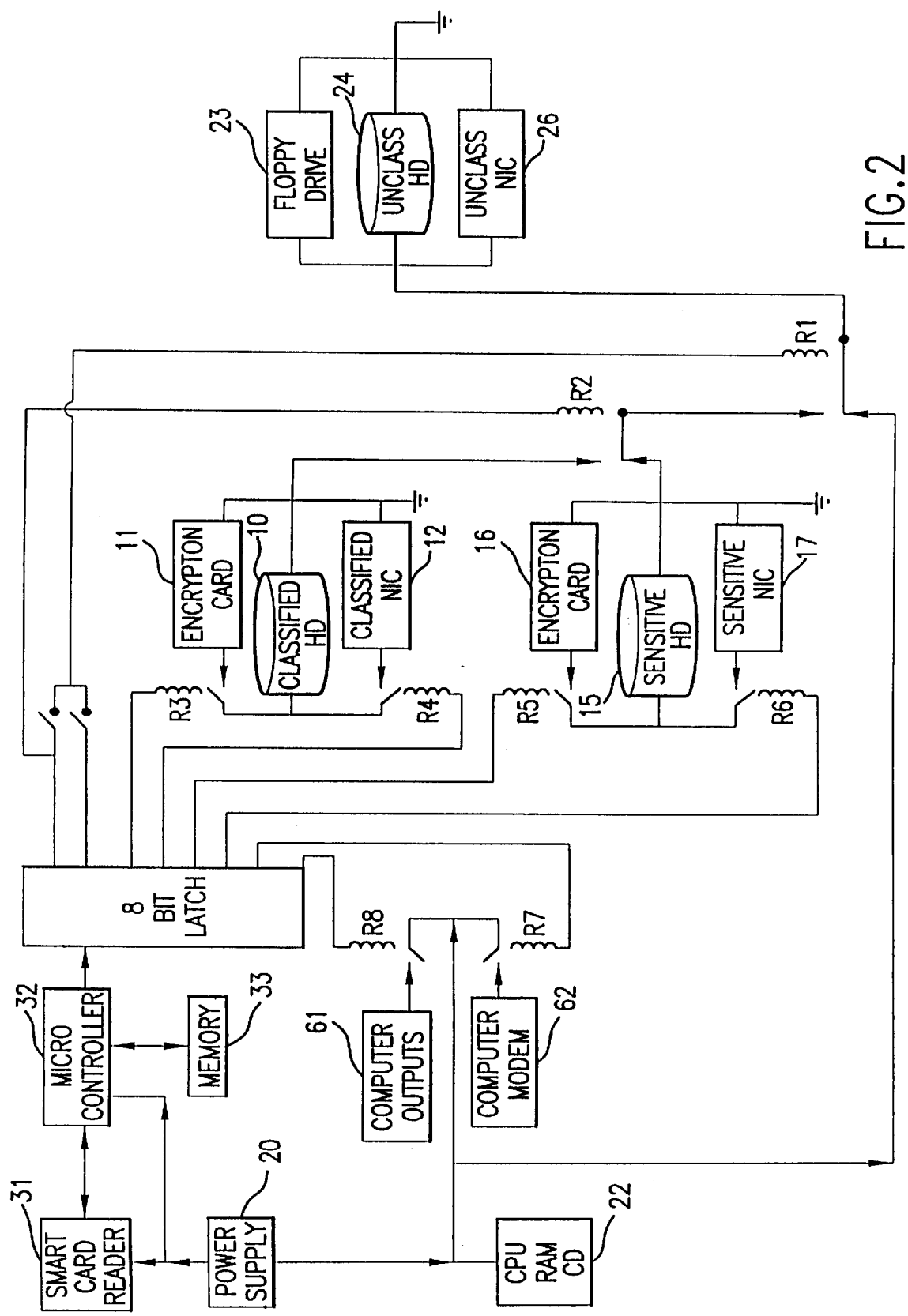
FIG. 2 is a block diagram of the multilevel computer system having additional circuitry for controlling access to specific assets within a security subsystem and the computer.

As illustratively shown in FIG. 2, the modifications differ from FIG. 1 with additional switching circuitry as depicted by electronically-activated switches R3 through R8, an access-control microcontroller 32 that interfaces with the smart-card reader 31, a non-volatile memory storage device 33 that interfaces with the access-control microcontroller, and a latching device 34 for storing a digital word output from the access-control microcontroller 32 and for interfacing with and activating electronically-activated switches R1 through R8. Both the non-volatile memory 33 and latching circuit 34 may be part of the access-control microcontroller 32 depending on the capabilities of the selected access-control microcontroller 32.

The access-control microcontroller 32 allows the use of memory cards, as well as, microprocessor cards since the program that would have been stored on the smart card 30 can now be stored entirely in the access-control microcontroller 32 memory if a memory card or micro-processor card is used. The storage of the identification information could be totally on the smart-card 30 or shared between the smart-card 30 and access-control microcontroller 32. In addition, the access-control microcontroller also could implement the program within the smart-card reader 31 thus allowing the use of virtually any smart-card reader regardless of its data processing capability. The use of a separate access-control microcontroller also allows the use of specialized secure microcontrollers. These secure microcontrollers provide increased security through the encryption of memory, scrambling of bus data and programs, and tamper-proof protection.

Another benefit in using a separate microcontroller 32 is the ability to easily control multiple electronically activated switches with a single output from the access-control microcontroller 32. The smart card reader 31 would operate under the control of the program in the access-control microcontroller 32 to read the identification information stored on the smart card 30. This information would then be used by the access-control microcontroller to generate a binary control word that would be stored in latching device 34. The latching device 34 could either be internal or external to the access-control microcontroller 32. Each bit of the binary control word could then be used to control the electronically activated switch to which it is connected. The first two bits of the binary control word, in essence, would be used as the first and second activation signals described previously. With an n bit binary control word a system with n+1 security levels could be controlled.

As an alternative to only controlling access to security levels, some of the bits in the binary control word also could be used to control access to specific assets within a security subsystem. In the three level system shown in FIG. 1 and FIG. 2 the first 2 bits would be dedicated as the first and second activation signal. As seen in FIG. 2, however, an 8 bit binary control word would allow bits 3 through 8 to be connected to electronically activated switches that control power to specific assets within the security subsystems such as NICs and modems. Power could be disabled to any of these devices by setting the appropriate bit in the binary control word. This would allow additional security sublevels to be implemented such that the smart card 30 of a user could be setup to allow or deny access to specific assets within a security subsystem at the selected level.

In addition to controlling assets within a security subsystem, some bits could be dedicated to controlling power to general assets such as those that connect directly to the computer motherboard or parallel and/or serial computer ports. This would allow a smart-card 30 to enable or disable devices such as PCMCIA (Personal Computer Memory Card International Association) Card Readers or other devices that are connected to the computer motherboard via a bus slot or peripherals connected to the computer Input/Output (I/O) ports. Control would be based on the security level of the user and their allowed rights to use an asset at that level. For example, the ability to disable printing for a specific set of users when they are operating at the classified level might be necessary if the printer connected to the computer is in a non-secure location.

The access-control microcontroller 32 would control assets connected via the motherboard through an interface card that would plug into the existing computer bus slots in the motherboard. The asset to be controlled would then be plugged into the interface card slot. This interface card would allow signal status to be sensed by the access-control microcontroller 32 to determine the status of the asset and would also allow power via the motherboard bus to be isolated and controlled at the interface card by the electronically activated switches. The interface card is in essence a Bus Isolation Extender Card such as those readily available from numerous vendors of computer testing products. Such cards are often used to disconnect power to an asset being tested without having to power down the entire computer.

Figure 3:
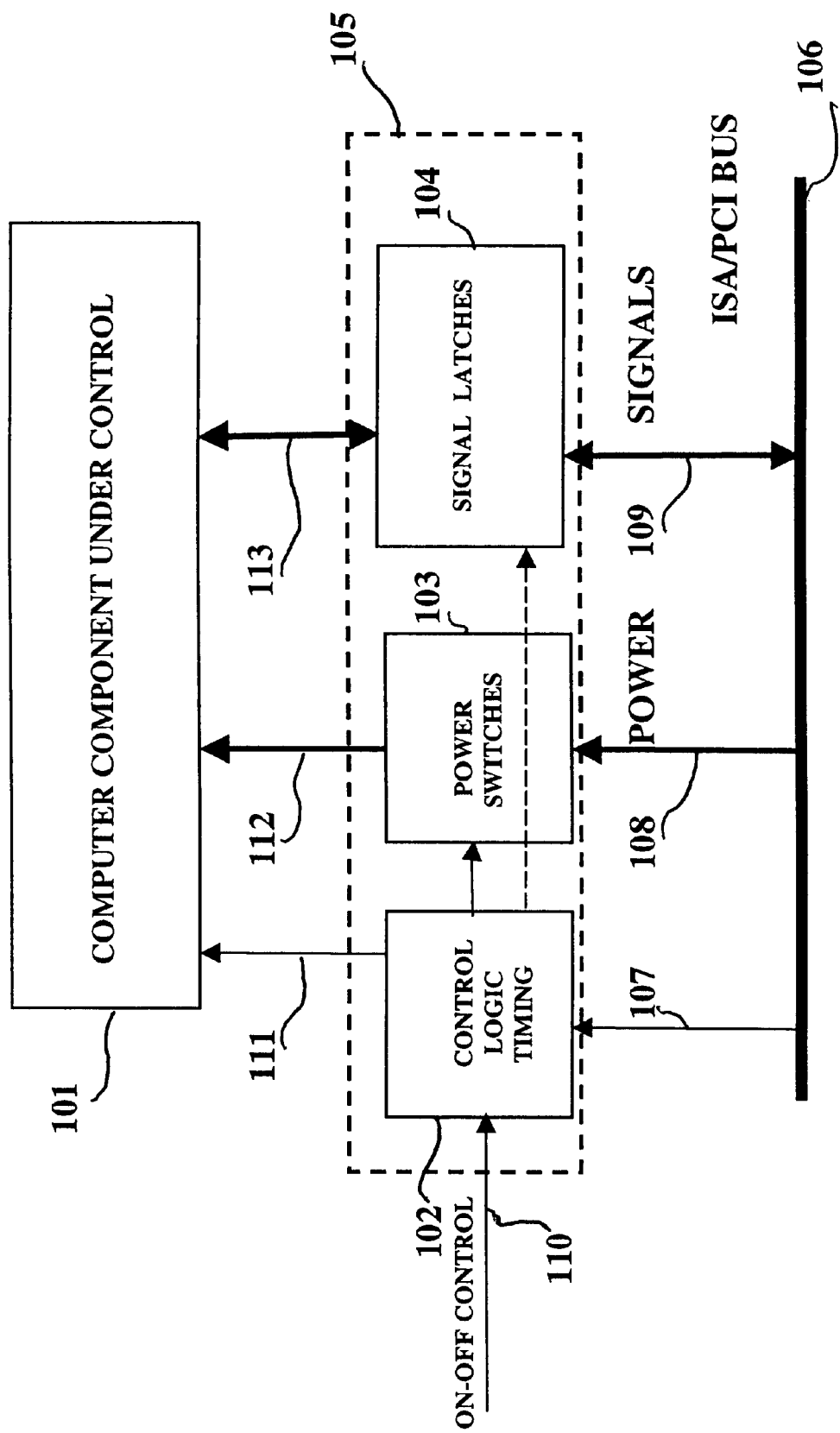
FIG. 3 is a block diagram of the Power Control Interface Circuit Card.

A functional block diagram of the interface card is shown in FIG. 3 as a Power Control Interface Circuit Card 105. The Power Control Interface Circuit Card 105 provides a useful means for controlling power to computer components or assets such as NICs, encryption cards, or modems that are designed to be inserted into ISA or PCI slots on the computer motherboard. As seen from FIG. 3, Power 108 would come from the ISA or PCI bus 106 shown in FIG. 3 along with the bus Signals 109 and the Control 107. The power control interface circuit card 106 would essentially replace each of the Relays R3, R4, R5, R6 and R7 from FIG. 2 for controlling power to encryption cards, NICs, and Modems that are designed for ISA or PCI slots. Control signals from the latching device 34 shown in FIG. 2 would connect to the On/Off Control 110 of the power control interface circuit card 105 shown in FIG. 3.

The power control interface circuit card 105 of FIG. 3 isolates the Power 108, the Signals 109 and the control 107 provided by the ISA or PCI bus from the ISA or PCI format Encryption Cards, NICs, and Modems that are represented as the Computer Component Under Control 101. The signals 109 are processed within the power control interface circuit card 106 by an electronically-activated power-switching subsystem, which includes the signal latches 104, that input the signals 109 from the PCI or ISA bus and output these same signals to the component under control 101 via the signals interface 113. Input and output operations are controlled via the control logic and timing circuits 102 which translate the control 107 from the ISA or PCI Bus 106 into logic signals that control the operation of the signal latches 104. This allows the data from the ISA or PCI Bus 106 to be transmitted in a continuous stream to the component under control 101 in the same manner as if the Component were inserted in the bus slot. This data stream can be terminated along with all power to the component under control 101 by the On/Off Control 110 which can disable all outputs 111, 112, and 113 by shutting off the power switches 103.

The access-control microcontroller 32 shown in FIG. 2 also could be programmed to perform additional security functions in addition to the identification and authentication and access control functions described thus far. The utilization of an on-board or external non-volatile memory storage device 33 allows the access-control microcontroller 32 to store audit data that is time stamped by the access-control microcontroller 32. This audit data could include data entered by the user during the identification and authentication and access control processes. The audit data also could include status data as to the success or failure of the user in gaining access to selected security levels and assets. Such data could be made available to certain personnel such as security administrators via their smart cards which would have a security level or profile that would allow such access.

Figure 4:
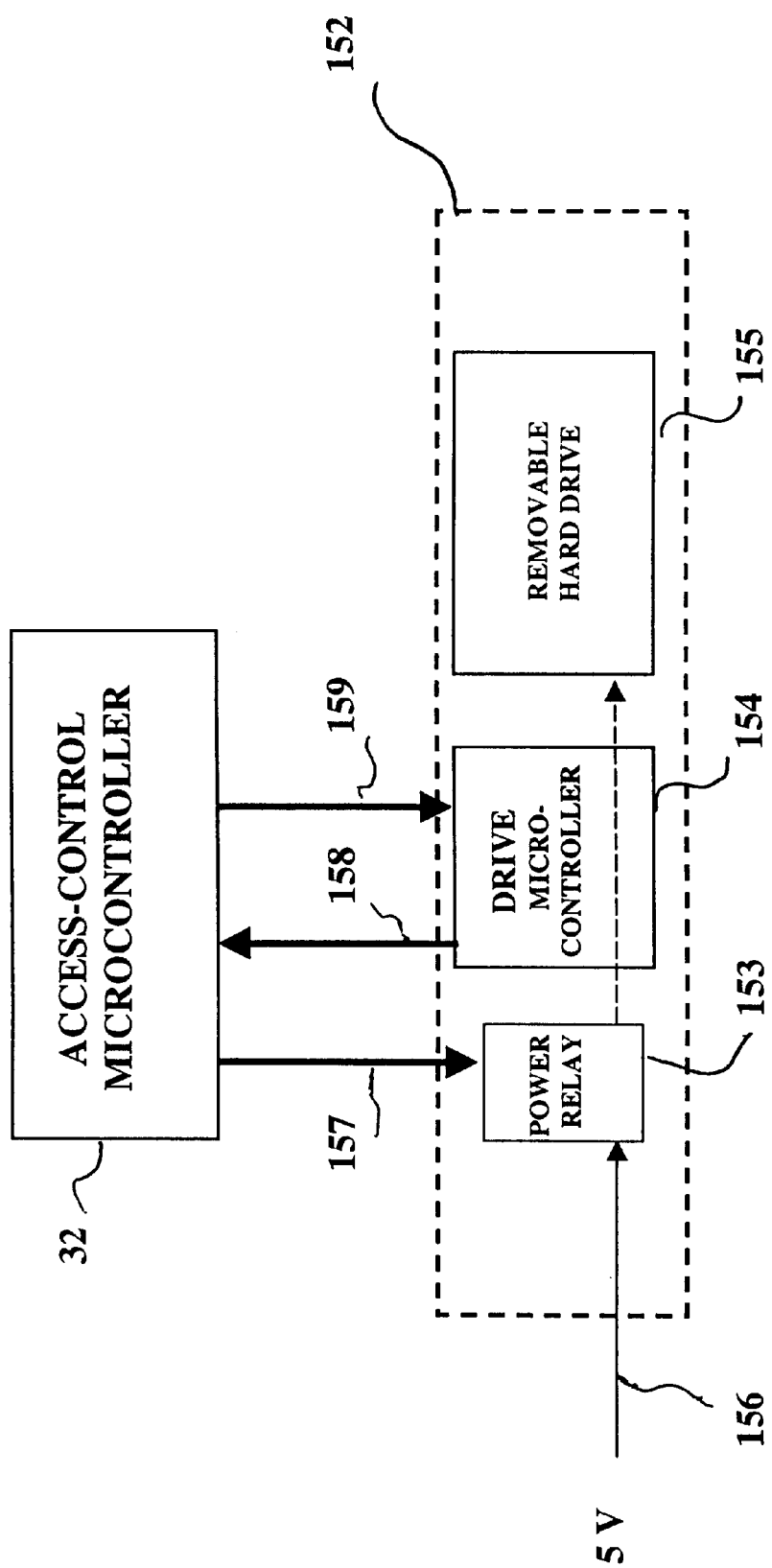
FIG. 4 is a block diagram of the Removable Memory Power Control Interface Assembly.

The removable memory power control interface assembly 152 shown in FIG. 4 provides a convenient means for controlling power for removable memory devices such as those used for the classified removable hard drive 10 and sensitive removable hard drive 15 of FIG. 2. This entire assembly can be installed within the drive receptacle to control power to the hard drive based on a coded Drive Identifier and Security Level. The access-control microcontroller 32 shown in FIG. 4, and in FIG. 2, initiates communications with the drive microcontroller 154 of FIG. 4 via an RS 232 Serial Interface shown by lines 158 and 159. These communications are initiated after the access-control microcontroller 32 completes the identification of a user via the smart-card 30 and sends an activation signal via S1 or S2 to the selected removable drive.

The communications begin with the access-control microcontroller 32 in FIG. 4 which sends a coded serial communications initialization signal over serial line 159 to the drive microcontroller 154. The drive microcontroller 154 will then compare the coded initialization signal with the code stored in its memory to determine if the code initialization signal is correct. An incorrect code initialization signal will immediately terminate the communications sequence. If the code is correct, then the drive microcontroller 154 will send the removable hard drive identifier and the security level of the removable drive 155 to the access-control microcontroller 32, typically over a serial line 158. The access-control microcontroller 32 will then compare the Drive Identifier with the code stored in its memory to determine if the Drive Identifier matches the identity code for the user and the Smart Card and if the security level matches the security level of the activation signal sent by the access-control microcontroller 32 for that removable drive. Any failure in the comparison process will cause the access-control microcontroller 32 to enable the unclassified security subsystem 26 shown in FIG. 2. A successful comparison will cause the access-control microcontroller 32 in FIG. 4 to output a relay enable signal over line 157 which will cause the Power Input 156, typically five volts, to energize Removable Hard Drive 155.

The removable memory power control interface assembly 152 provides several improvements for the control of Removable Hard Drives depicted in FIG. 2. A primary improvement is that the entire power control apparatus can be built into the drive and is transparent to the host computer. The second improvement is that the security level of the drive as determined from the activation signals sent over S1 or S2 of FIG. 2 is further verified by a code from the drive microcontroller 154 of FIG. 4. Also, the user's smart-card 31 shown in FIG. 2 and the stored identity and security attributes are now directly linked to both the access-control microcontroller 32 and the removable hard drive 155. This gives the user a strong and direct security association with the data stored on the hard drive being accessed.

It will be apparent to those skilled in the art that various modifications can be made to the multilevel computer security system and method of the instant invention without departing from the scope or spirit of the invention, and it is intended that the present invention cover modifications and variations of the multilevel computer security system and method provided they come within the scope of the appended claims and their equivalents.

I claim:

1. A multilevel computer security system operating within a core computer that includes a central processor unit (CPU), random access memory (RAM), and a computer-power supply with the CPU coupled to and controlling the operation of devices and data interfaces within the computer for data processing, data communications, and data storage, said computer security system being comprised of:

a first security subsystem coupled to the core computer via a data bus, having means for storing the data and communicating data at a first security level;

at least one additional-security subsystem coupled to the core computer via the data bus, with each of said additional-security subsystem having means for storing data at a designated and exclusive security level higher than the first security level, each of the additional-security subsystems including power-indicator means for illuminating when the additional-security subsystem is receiving power from the computer-power supply;

access control means comprising a micro-controller that processes access requests and identification and authentication information from a user and correlate it with the security identification requirements and access privilege information stored within a security token possessed by the user to output an activation signal representative of the security level that will be granted to the user;

sensor means that enables the transmission of the activation signal from the access control means to the electronically-activated power switching means only if the additional-security subsystem is determined by said sensor means to be at a security level corresponding to the security level represented by said activation signal; and an electronically-activated power switching means, responsive to the electronic activation signals from an access-control means in order to select the components of a security subsystem at the granted security level of the user and connect power to only said selected components thereby isolating said powered security subsystem and the data at its designated security level from all other security subsystems.

2. The multilevel computer security system of claim 1, with said electronically activated power switching means for said security subsystem components that interface directly with the computer data bus being comprised of a power control interface circuit card with a Male Bus Connector at one end and a Female Computer Bus connector at the opposite end so that said circuit card Male Connector can be inserted into said computer data bus Female Connector and the signals from said computer data bus, including computer power, can be transmitted to circuits on said circuit card that can isolate and control their transmission to said circuit card Female Connector in response to said electronic activation signals from said access-control means so that power to a computer component inserted into the Female Bus Connector of said circuit card can be enabled or disabled based on whether the security subsystem to which said component belongs is selected or not selected by said access control means.

3. The multilevel computer security system of claim 2, with said computer data bus being either a ISA or PCI Bus.

4. The multilevel computer security system of claim 2, with said computer security subsystem components being comprised of data processing and data communications components that include NIC Cards, Modems, and Data Encryptors.

5. The multilevel computer security system of claim 1, with the electronically-activated switching means of said security subsystem components that interface directly with the computer power supply via a power circuit comprising individual relays, with each relay having a common contact connected to the normally open contact of only one other relay and when activated each relay switches its common contact from a first state in which said common contact is connected to the power circuit of one security subsystem via its normally closed contact to a second state in which said common contact is connected to the power circuit of a second security subsystem via its normally open contact.

6. The multilevel computer security system of claim 5, with said computer security subsystem components being comprised of data storage components that include disk drives.

7. The multilevel computer security system of claim 5, with said computer subsystem components of said additional-security subsystem being comprised of removable hard drives.

8. The multilevel computer security system of claim 7, with said removable hard drives having a power control interface that connects to said additional-security subsystem power circuit to enable power from said power circuit in response to a power enable signal from the microcontroller in said access control means only if the identity and the security level of the removable hard drive provided to said microcontroller in said access control means by said power control interface is the same as the security level and identity of said removable hard drive read from said secure token by the microcontroller within said access control means.

9. The multilevel computer security system of claim 8, with said removable hard drive power control interface being comprised of a microcontroller that stores the security level and identity of said removable hard drive and communicates this information to the microcontroller in said access control means when the correct communications initialization signal is received from said microcontroller in said access control means.

10. The multilevel computer security system of claim 9, with the power from said power circuit being switched to said removable hard drive by a relay on said removable hard drive power control interface being closed in response to said power enable signal from the microcontrroller in said access control means.

* * * * *